Figure 1:
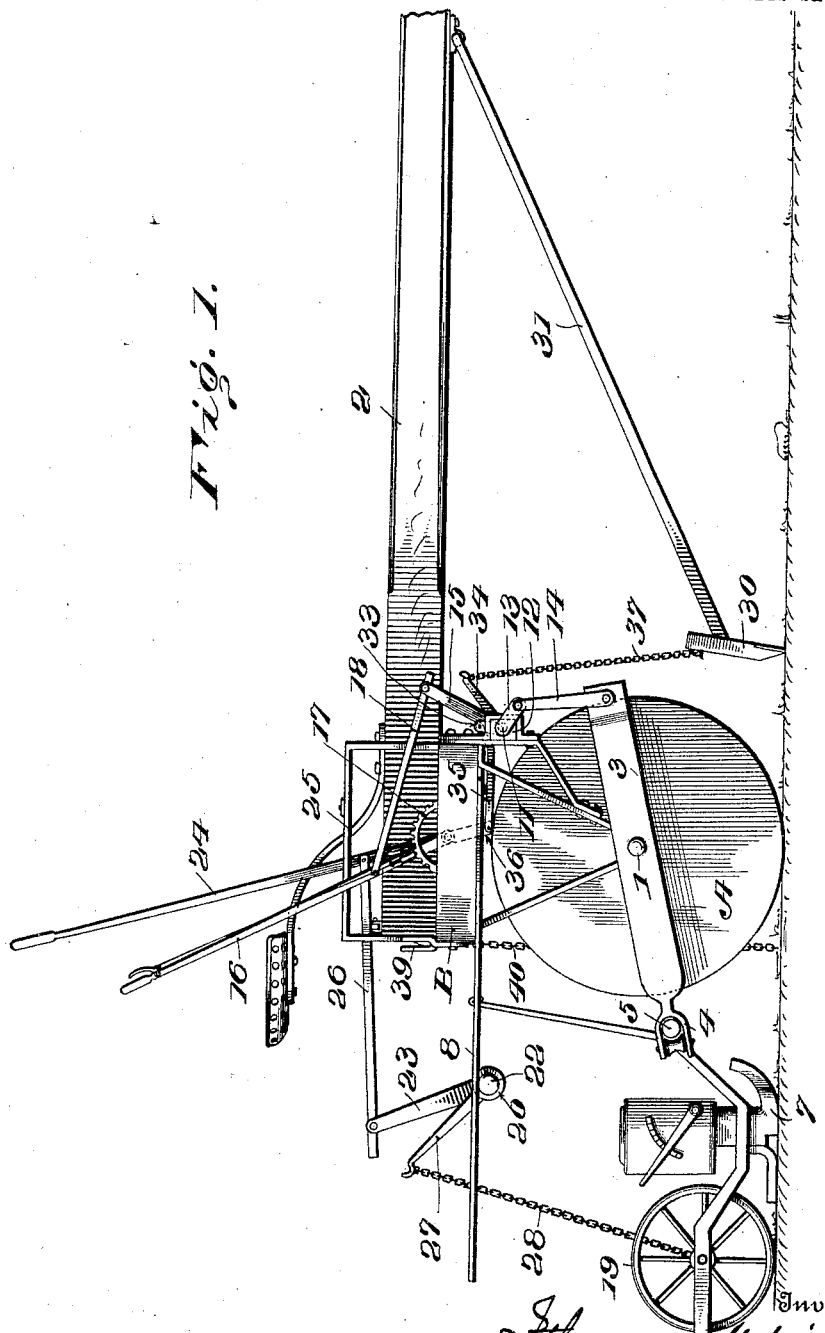

I. G. WILCOX.
GANG SEEDING DRILL.
APPLICATION FILED MAY 24, 1912.

1,067,956.

Patented July 22, 1913.
4 SHEETS—SHEET 1.

Witnesses
Lloyd W. Patch
R. C. Braddock.

Inventor
Ithemare G. Wilcox
By Louis Bagby & Co.
his Attorneys

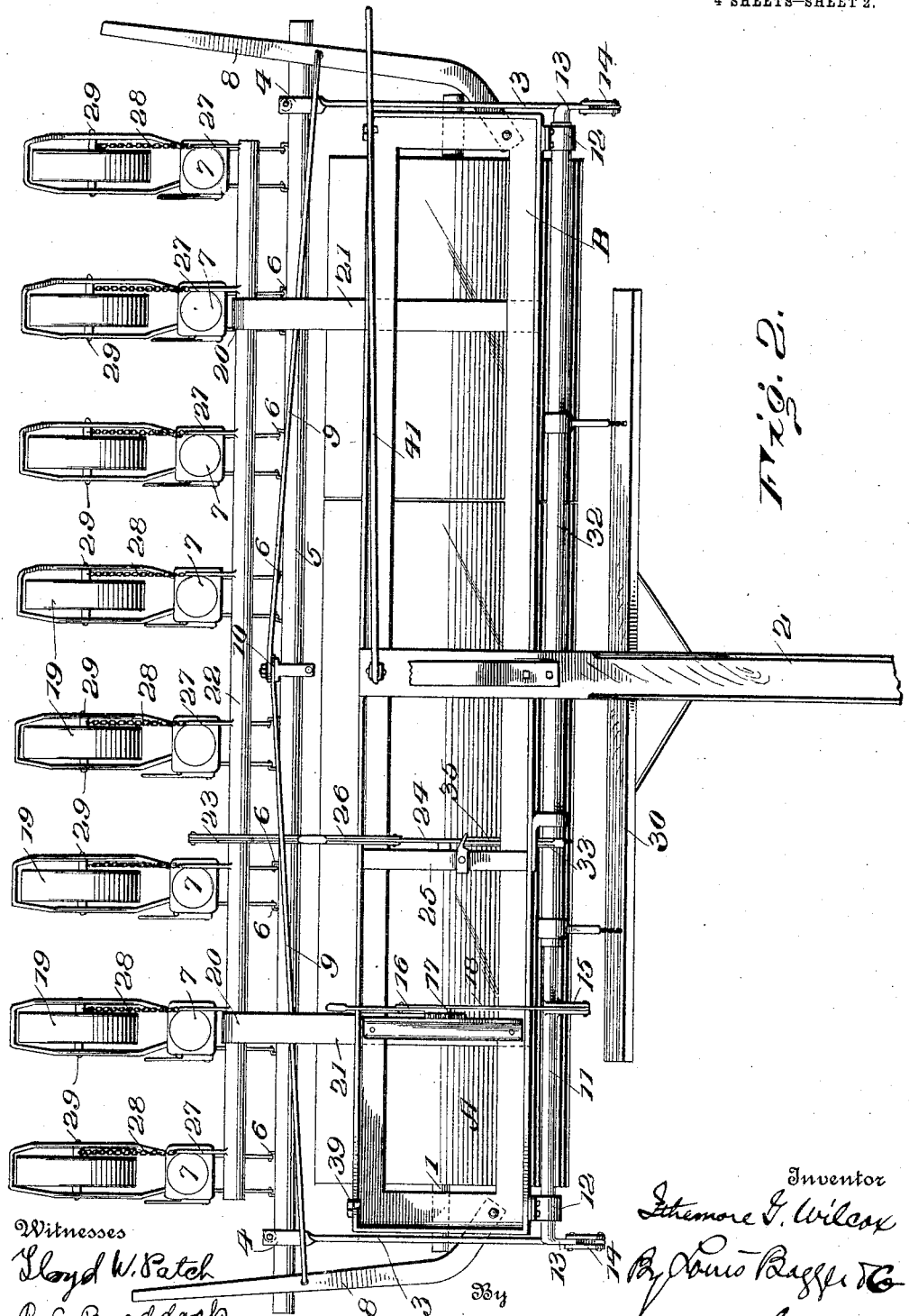

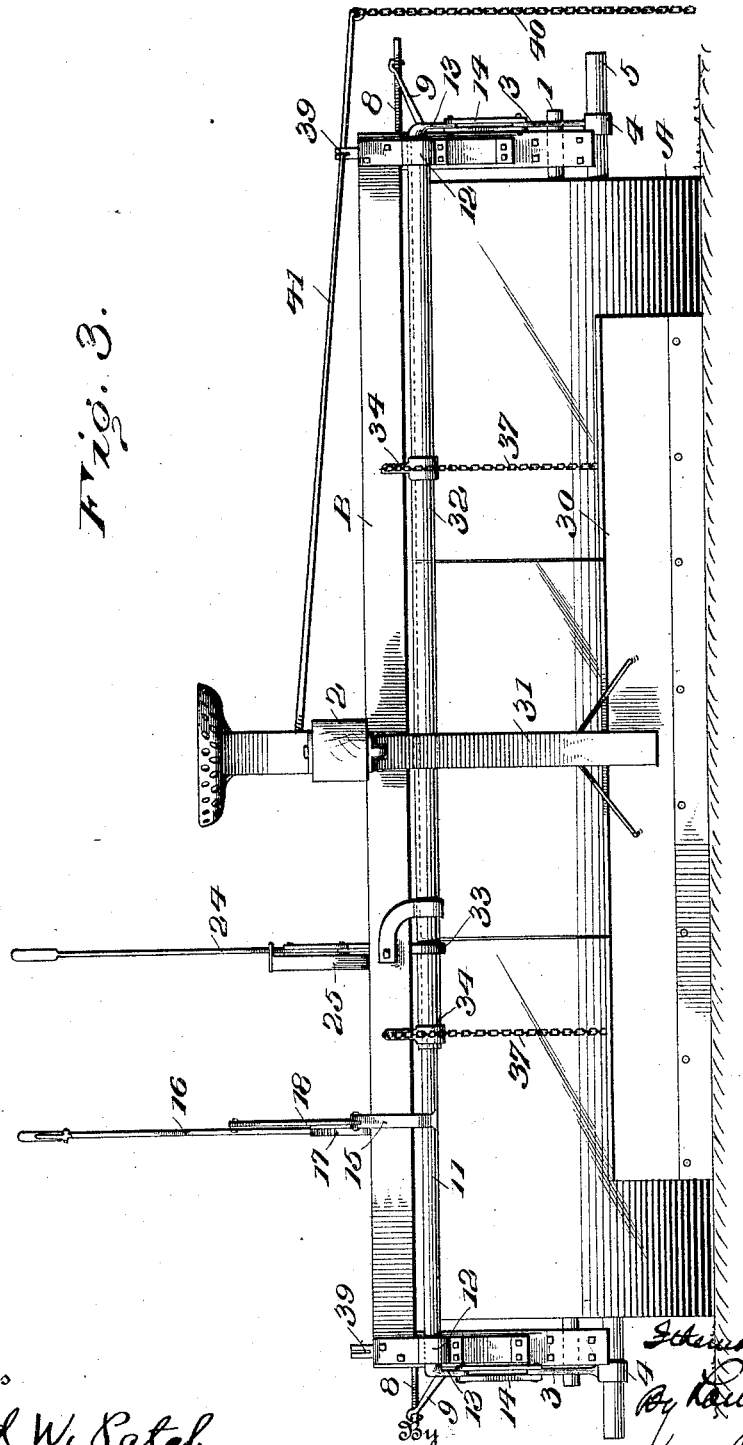

I. G. WILCOX.
GANG SEEDING DRILL.
APPLICATION FILED MAY 24, 1912.

1,067,956.

Patented July 22, 1913.
4 SHEETS—SHEET 4.

UNITED STATES PATENT OFFICE.

ITHEMORE G. WILCOX, OF McGUFFEY, OHIO.

GANG SEEDING-DRILL.

1,067,956. Specification of Letters Patent. Patented July 22, 1913.

Application filed May 24, 1912. Serial No. 699,463.

*To all whom it may concern:*

Be it known that I, ITHEMORE G. WILCOX, a citizen of the United States, residing at McGuffey, in county of Hardin and State of Ohio, have invented certain new and useful Improvements in Gang Seeding-Drills, of which the following is a specification.

My invention relates to an improvement in gang seeding drills, and the object is to provide a structure which, in combination with a land-roller, places the parts in the best operative position, and also in the provision of means whereby the several parts may be regulated and thrown into and out of operative position as the action may require.

In the accompanying drawings:—Figure 1 is a view in side elevation of my improved drill, Fig. 2 is a top plan view, Fig. 3 is a front elevation, and Fig. 4 is a rear elevation of the machine.

A land-roller A has mounted on the axle 1 thereof a frame B upon which the various mechanism is supported; and connected with the frame is a tongue 2 to which the draft animals may be attached, and by which the roller is drawn. Adjusting levers 3, 3, are journaled on the axle 1 at each end of the frame; and in the bearings 4, 4, formed on the rear ends of the adjusting levers a rod 5 is mounted to have a free lateral endwise movement. Hooks 6, 6, are provided on the rear side of the rod 5, and a drill 7 of any approved style is hinged to each pair of hooks. In the present instance I have shown eight of these sets of hooks and drills supported thereby, although it is evident that a greater or lesser number might be used.

Shifting-levers 8, 8, are connected to the frame B near each end and are pivoted to swing in a horizontal plane. Links 9, 9, are pivotally connected at 10 to the rod 5, and at the outer ends connected to the shifting-levers in such a manner that, when one of the shifting-levers is swung in or out, the rod 5 and all of the drills supported thereby are shifted to one side or the other to bring them into proper spacing with the rows already planted. By this arrangement, when the first row is started across the field at one side, the shifting-lever 8 may be moved so that the first row at the side will be a proper distance from the unplowed edge of the field, and as the drills are all carried by the rod 5 they will remain in the same spaced relation. This structure is also advantageous in turning at the end of the row, for the reason that the drills may be shifted into proper alinement with the row just planted, even though the parts in their normal position are not in proper alinement with that row.

The crank-shaft 11 is journaled in bearings 12 on the forward part of the frame, and has the cranks 13, 13, formed on each end and preferably vertically above the forward end of the adjusting levers 3 to which they are connected by links 14, 14. An upwardly-projecting crank 15 is formed on the crank-shaft 11. A hand lever 16 is pivoted to the frame in position to work in connection with the segment 17, and has a link 18 connected therewith and with the crank 15 for operating the shaft 11 to raise or lower the adjusting levers 3, which, due to their connection with the axle 1, cause the forward part or furrow-forming mechanism of the drill 7 to rise from the ground or be forced farther thereinto, due to the support at the rear by the wheel 19.

Bearings 20, 20, are formed on the bars 21, which extend to the rear of the frame near each end thereof, and in these bearings is journaled a shaft 22 having a crank 23 formed thereon. A hand lever 24 is journaled to the frame B to work in connection with the segment 25, and is connected by the link 26 with the crank-arm 23 on the shaft 22. Hooked rods 27 are secured to the shaft 22, one for each drill, and mounted preferably vertically thereabove. A chain 28 extends from each hook to the axle 29 of the corresponding drill-wheel 19.

A drag-scraper 30 is placed slightly forward of the roller A, and is pivotally connected to the tongue 2 by a brace 31. A sleeve 32 is received around the crank-shaft 11 and has formed thereon two crank-arms 33 and 34. A link 35 is connected to the crank-arm 33 and with the lower extension 36 of the hand-lever 24, and a chain 37 connects the drag-scraper 30 with the crank-arm 34, whereby, when the hand-lever 24 is operated, the scraper is raised or lowered.

A marking rod 41 is pivoted to the frame at 38 preferably in the longitudinal center thereof, and the forked supports 39 are secured near the ends of the frame in position to receive the rod 41 and hold it against lateral movement. A drag-chain 40 is secured to the free end of the rod 41 and is of sufficient length to drag upon the ground and mark the course to be taken in planting the next row or rows.

In this way I have provided a seeder having the drills mounted in gangs in such a manner that the depth at which the seeds are planted is within easy control of the operator, and also with which, when the drills are thrown out of operative relation, the drag-scraper (for better preparing the soil) is also raised out of operative relation.

It will be understood that any form of construction of drill may be used with this structure and that the drills are all controlled at the same time, and may be shifted endwise with respect to the roller as a unit.

Having fully described my invention, what I claim as new and desire to secure by Letters Patent, is:—

1. The combination with a land-roller, of a drag scraper mounted in advance of the roller, a plurality of independent drills attached to the frame in the rear of the roller in such a manner that the depth at which the seed is planted may be regulated, and means for throwing the drills and scraper into and out of operative relation and for adjusting the depth of the furrow.

2. The combination with a land-roller, of a frame carried by the roller, a drag-scraper carried by the frame and mounted in advance of the roller, shifting-levers, a plurality of drills connected to said shifting-levers in the rear of the roller, means for controlling the depth of furrow, and means for raising the drag-scraper and the drills from the ground.

3. The combination with a land-roller, of a frame mounted above and carried by said roller, a tongue secured to the frame and extending forwardly therefrom, a drag-scraper pivotally connected to said tongue, adjusting-levers mounted on the axles of said rollers, a plurality of drills connected at their forward ends to the adjusting levers, a shaft carried by the frame to which the drills are connected at their rear ends, means for shifting the adjusting levers to regulate the depth of the furrow, and means for turning the shaft to raise the drills from operative position.

4. The combination with a land-roller, of a frame mounted above and carried by said roller, a tongue secured to the frame and extending forwardly therefrom, a drag-scraper pivotally connected to said tongue, adjusting levers mounted on the axles of said rollers, a plurality of drills connected at their forward ends to the adjusting levers, a shaft carried by the frame to which the drills are connected at their rear ends, means for shifting the adjusting levers to regulate the depth of the furrow, and means for swinging the drag-scraper upwardly and raising the drills from operative position simultaneously.

5. The combination with a land-roller, of a frame, adjusting levers mounted on the axles of said roller, a rod connected to said adjusting-levers to have endwise movement, a shaft carried by the frame, drills secured to said rod at their forward end and by flexible means to said shaft at their rear end, means for raising and lowering said adjusting levers to regulate the depth of the furrow, means for operating said shaft to raise the drills from operative position, and means to shift said rod whereby all of the drills are moved to one side or the other.

6. The combination with a land-roller, of a frame, adjusting levers connected to the axles of the roller, a rod mounted on the rear ends of said adjusting-levers to have endwise movement, a shaft carried by the frame above said rod, hooks formed on said shaft, a plurality of drills connected at their forward end to the rod and flexible connections between the hooks and the drills at their rear end, a drag-scraper mounted in advance of the roller, means for shifting the adjusting levers to regulate the depth of furrow, a lever to control the movement of the shaft for raising and lowering the drills and simultaneously raising or lowering the drag-scraper, and means for shifting the rod endwise to move the drills to one side or the other.

In testimony whereof I affix my signature, in the presence of two witnesses.

ITHEMORE G. WILCOX.

Witnesses:
 TIMOTHY G. THOMAS,
 M. R. QUINT.

---

Copies of this patent may be obtained for five cents each, by addressing the "Commissioner of Patents, Washington, D. C."